United States Patent
Hirano et al.

(10) Patent No.: US 9,238,708 B2
(45) Date of Patent: Jan. 19, 2016

(54) ORGANOSILOXANE-MODIFIED NOVOLAK RESIN AND MAKING METHOD

(71) Applicant: Shin-Etsu Chemical Co., Ltd., Tokyo (JP)

(72) Inventors: Yoshinori Hirano, Annaka (JP); Hideyoshi Yanagisawa, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 14/330,175

(22) Filed: Jul. 14, 2014

(65) Prior Publication Data
US 2015/0057416 A1 Feb. 26, 2015

(30) Foreign Application Priority Data
Aug. 20, 2013 (JP) ................................. 2013-170436

(51) Int. Cl.
C08G 61/02 (2006.01)
C08G 8/28 (2006.01)

(52) U.S. Cl.
CPC ........ *C08G 61/02* (2013.01); *C08G 8/28* (2013.01); *C08G 2261/144* (2013.01); *C08G 2261/3424* (2013.01)

(58) Field of Classification Search
CPC .............. C08G 8/08; C08G 8/10; C08G 8/24; C08G 8/28; C08G 2261/144; C08G 77/38; C08G 77/42
USPC ............................................ 525/534; 14/534
See application file for complete search history.

(56) References Cited

U.S. PATENT DOCUMENTS

| | | | | | |
|---|---|---|---|---|---|
| 4,022,753 | A | * | 5/1977 | Lohse et al. | 525/480 |
| 4,877,822 | A | * | 10/1989 | Itoh et al. | 523/433 |
| 4,902,732 | A | * | 2/1990 | Itoh et al. | 523/433 |
| 5,053,445 | A | * | 10/1991 | Itoh et al. | 523/435 |
| 5,173,544 | A | * | 12/1992 | Shimizu et al. | 525/476 |
| 5,206,312 | A | * | 4/1993 | Liao et al. | 525/474 |
| 5,252,687 | A | * | 10/1993 | Shiomi et al. | 525/502 |
| 5,290,882 | A | * | 3/1994 | Shiobara et al. | 525/422 |
| 6,429,238 | B1 | * | 8/2002 | Sumita et al. | 523/461 |

FOREIGN PATENT DOCUMENTS

| | | | |
|---|---|---|---|
| JP | 58-122922 | A | 7/1983 |
| JP | 03-097710 | A | 4/1991 |
| JP | 05-059175 | A | 3/1993 |

\* cited by examiner

*Primary Examiner* — Mike M Dollinger
(74) *Attorney, Agent, or Firm* — Westerman, Hattori, Daniels & Adrian, LLP

(57) ABSTRACT

An organosiloxane-modified novolak resin comprising structural units having formula (1) wherein $R^1$ is an organosiloxy group having a monovalent $C_1$-$C_{10}$ hydrocarbon group bonded to silicon, and $R^2$ is H or $C_1$-$C_4$ alkyl or alkoxy. The resin has high heat resistance and high strength inherent to novolak resins and low stress inherent to organosilicon compounds.

13 Claims, 1 Drawing Sheet

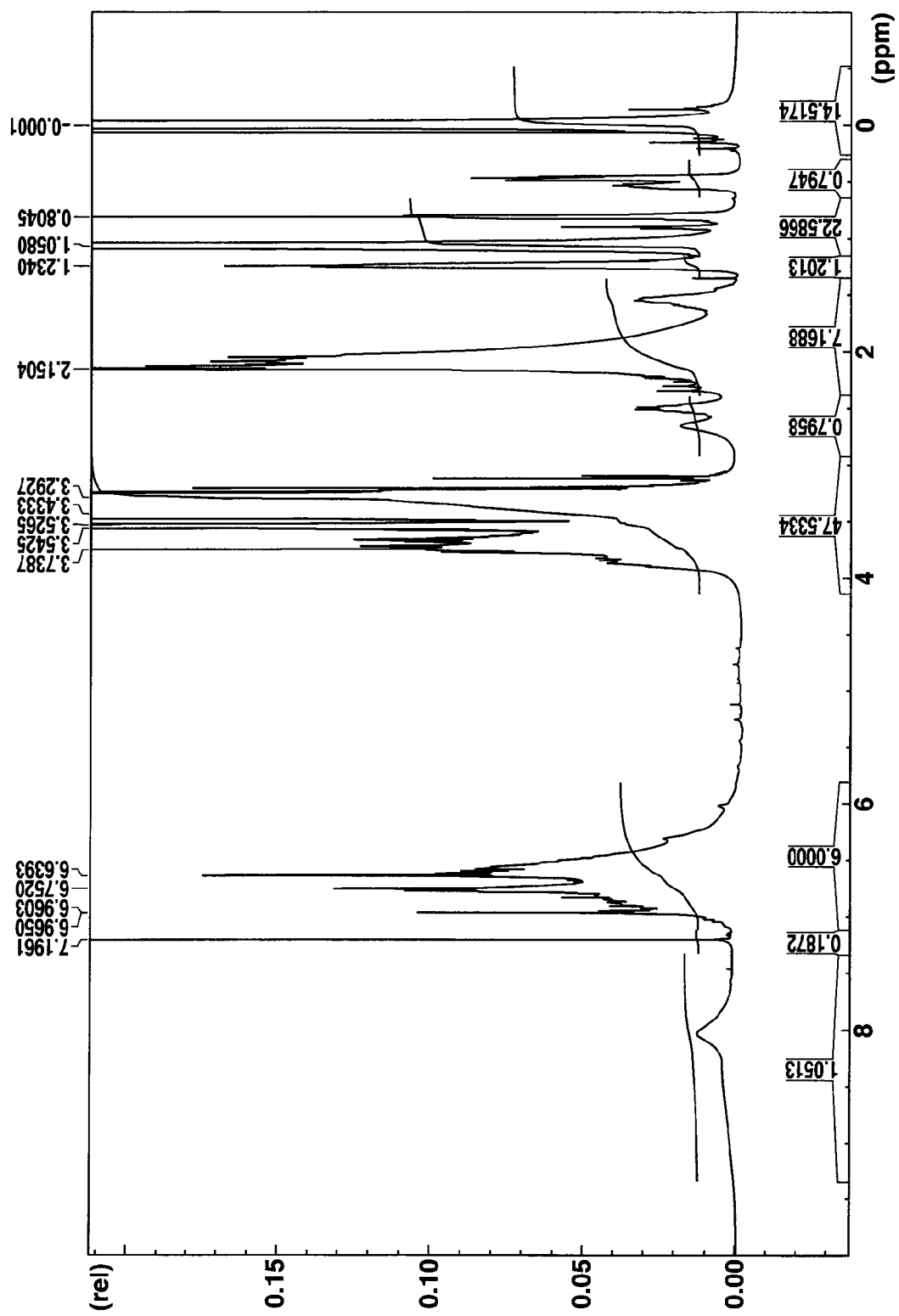

ORGANOSILOXANE-MODIFIED NOVOLAK RESIN AND MAKING METHOD

CROSS-REFERENCE TO RELATED APPLICATION

This non-provisional application claims priority under 35 U.S.C. §119(a) on Patent Application No. 2013-170436 filed in Japan on Aug. 20, 2013, the entire contents of which are hereby incorporated by reference.

TECHNICAL FIELD

This invention relates to organosiloxane-modified novolak resins and a method for preparing the same.

BACKGROUND ART

A variety of silicone-modified novolak resins are known in the art. Many documents including JP-A S58-122922, for example, describe novolak resins in which phenolic hydroxyl groups are silicone modified. With these structures, the characteristics of silicone compounds are outstandingly exerted because the characteristic of phenolic hydroxyl group which is one of characteristics of novolak resins is excluded. Another class of silicone-modified novolak resins includes siloxane-modified novolak resins having a conjugated double bond as described in JP-A H03-97710. Since the siloxane modifier used in this document is an organopolysiloxane having hydrosilyl groups at both ends, intramolecular and/or intermolecular bonds are formed, posing limits to molecular motion. In addition, since the resin has a conjugated double bond and an epoxy group within a molecule, the low stress characteristic of silicone is compromised despite good mechanical properties after final curing. Also, novolak type phenolic resins which are silicone modified by block copolymerization are known from JP-A H05-59175, for example. Since they are obtained from copolymerization of telechelic novolak resin with telechelic polysiloxane, they have the drawbacks that preparation of such intermediates is cumbersome, and the alkali dissolution rate is slow because of the structure containing polysiloxane in the backbone. It would be desirable to have a novolak resin having a high alkali dissolution rate and low stress.

CITATION LIST

Patent Document 1: JP-A S58-122922
Patent Document 2: JP-A H03-97710
Patent Document 3: JP-A H05-59175

DISCLOSURE OF INVENTION

An object of the invention is to provide a novel organosiloxane-modified novolak resin obtained by adding only one hydrosilyl group in an organosiloxane molecule to a novolak resin and thus endowed with the low stress induction of silicone, and a method for preparing the same.

The inventors have found that the above and other objects are achieved by an organosiloxane-modified novolak resin which is obtained from hydrosilylation reaction between a novolak resin derived from an allyl-containing phenol and an organosiloxane having one hydrosilyl group in a molecule.

Accordingly, the invention provides an organosiloxane-modified novolak resin comprising structural units having the formula (1):

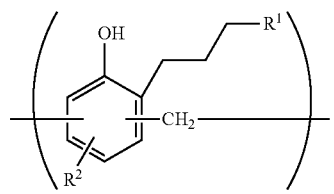

wherein $R^1$ is an organosiloxy group having a substituted or unsubstituted monovalent hydrocarbon group of 1 to 10 carbon atoms bonded to a silicon atom, and $R^2$ is hydrogen or a substituted or unsubstituted alkyl or alkoxy group of 1 to 4 carbon atoms.

In a preferred embodiment, $R^1$ is an organosiloxy group having the formula (2).

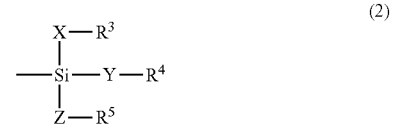

Herein $R^3$, $R^4$ and $R^5$ are each independently a substituted or unsubstituted monovalent hydrocarbon group of 1 to 10 carbon atoms, X, Y and Z are each independently a single bond or a divalent siloxane structure having the formula (3), with the proviso that at least one of X, Y and Z is a divalent siloxane structure having the formula (3),

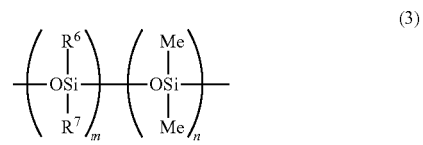

wherein $R^6$ and $R^7$ are each independently a substituted or unsubstituted monovalent hydrocarbon group of 1 to 10 carbon atoms, Me is methyl, m and n each are 0 or a positive number, and m+n is an integer of at least 1.

In another aspect, the invention provides a method for preparing an organosiloxane-modified novolak resin, comprising effecting hydrosilylation reaction between an allyl-containing novolak resin comprising structural units having the formula (4) and an organosiloxane containing one hydrosilyl group in a molecule.

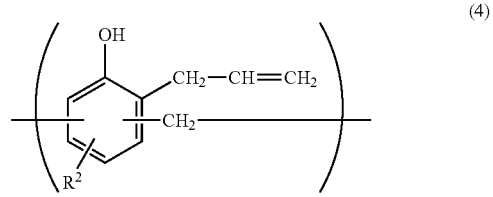

Herein $R^2$ is hydrogen or a substituted or unsubstituted alkyl or alkoxy group of 1 to 4 carbon atoms.

In a preferred embodiment, the organosiloxane containing one hydrosilyl group in a molecule has the formula (5).

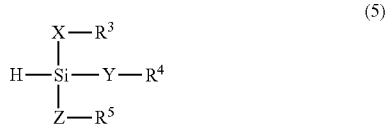

(5)

Herein $R^3$, $R^4$ and $R^5$ are each independently a substituted or unsubstituted monovalent hydrocarbon group of 1 to 10 carbon atoms, X, Y and Z are each independently a single bond or a divalent siloxane structure having the formula (3), with the proviso that at least one of X, Y and Z is a divalent siloxane structure having the formula (3),

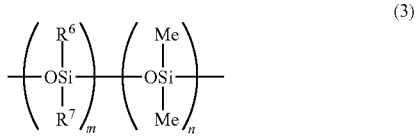

(3)

wherein $R^6$ and $R^7$ are each independently a substituted or unsubstituted monovalent hydrocarbon group of 1 to 10 carbon atoms, Me is methyl, m and n each are 0 or a positive number, m+n is an integer of at least 1.

Advantageous Effects of Invention

The organosiloxane-modified novolak resin of the invention has high heat resistance and high strength inherent to novolak resins and low stress induction inherent to organosilicon compounds.

BRIEF DESCRIPTION OF DRAWINGS

FIG. 1 is a $^1$H-NMR chart of an organosiloxane-modified novolak resin in Example 1.

DESCRIPTION OF PREFERRED EMBODIMENTS

The invention provides an organosiloxane-modified novolak resin having structural units having the formula (1). The organosiloxane-modified novolak resin may be prepared by effecting hydrosilylation reaction between an allyl-containing novolak resin comprising structural units having the formula (4) and an organosiloxane containing one hydrosilyl group in a molecule.

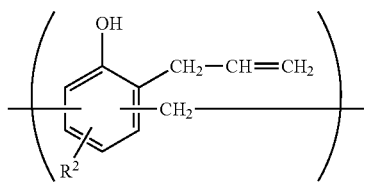

(4)

Herein $R^2$ is hydrogen or a substituted or unsubstituted alkyl or alkoxy group of 1 to 4 carbon atoms. Suitable substituted alkyl groups include fluoroalkyl groups.

The novolak resin is derived from an allyl-containing phenol as one reactant. Examples of the allyl-containing phenol include 2-allylphenol, 4-allylphenol, 6-methyl-2-allylphenol, and 4-allyl-2-methoxyphenol, with 2-allylphenol being preferred. The allyl-containing phenol preferably accounts for 1 to 40%, more preferably 2 to 25% by weight of the overall phenols of which the novolak resin is constructed.

Other phenol reactants include well-known phenols, for example, phenol, m-cresol, o-cresol, p-cresol, xylenols such as 2,3-xylenol, 2,5-xylenol, 3,5-xylenol, and 3,4-xylenol, alkylphenols such as m-ethylphenol, p-ethylphenol, o-ethylphenol, 2,3,5-trimethylphenol, 2,3,5-triethylphenol, 4-tert-butylphenol, 3-tert-butylphenol, 2-tert-butylphenol, 2-tert-butyl-4-methylphenol, 2-tert-butyl-5-methylphenol, and 6-tert-butyl-3-methylphenol, alkoxyphenols such as p-methoxyphenol, m-methoxyphenol, p-ethoxyphenol, m-ethoxyphenol, p-propoxyphenol, and m-propoxyphenol, isopropenylphenols such as o-isopropenylphenol, p-isopropenylphenol, 2-methyl-4-isopropenylphenol, and 2-ethyl-4-isopropenylphenol, polyhydroxyphenols such as 4,4'-dihydroxybiphenyl, bisphenol A, phenylphenol, resorcinol, hydroquinone, and pyrogallol, α-naphthol, β-naphthol, and dihydroxynaphthalene. Of these reactants, phenol, o-cresol, m-cresol, p-cresol, 2,3-xylenol, 2,5-xylenol, and 3,5-xylenol are preferred.

From these phenols, novolak resins may be prepared by any well-known techniques. The novolak resins thus obtained should preferably have a weight average molecular weight (Mw) of 2,000 to 50,000, more preferably 3,000 to 20,000, as measured versus polyhydroxystyrene standards by gel permeation chromatography (GPC).

To modify the allyl group-containing novolak resin with an organopolysiloxane, it is preferable to use an organopolysiloxane having a SiH group which is added to the allyl group contained in the novolak resin, especially a compound having the structure of the following formula (5), thereby obtaining the organopolysiloxane-modified novolak resin of formula (1) in which $R^1$ is the group shown by the following formula (2):

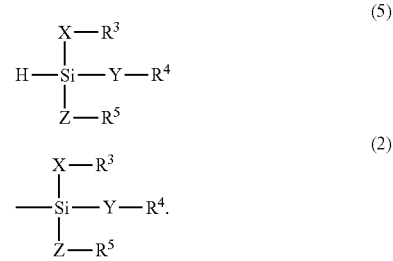

(5)

(2)

Herein, X, Y and Z are each independently a single bond or a divalent siloxane structure having the formula (3):

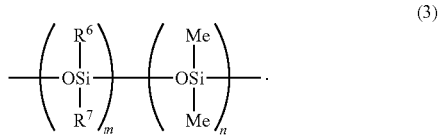

(3)

In the above formula, $R^3$, $R^4$, $R^5$, $R^6$ and $R^7$ are each independently substituted or unsubstituted monovalent hydrocarbon group having 1 to 10, preferably 1 to 6, more preferably 1 to 3 carbon atoms such as halogen atom or alkoxy-substituted or unsubstituted alkyl group or aryl group. Me is methyl group. At least one of X, Y and Z is the group of formula (3) in which m and n each are 0 or a positive number, and m+n is an integer of at least 1, preferably 1≤m+n≤1,000, more preferably 10≤m+n≤200. The others are a single bond or the group of formula (3) in which m and n each are 0 or a positive number, and m+n is an integer of at least 1, preferably 1≤m+n≤1,000, more preferably 1≤m+n≤200.

Suitable monovalent hydrocarbon groups represented by $R^3$, $R^4$, $R^5$, $R^6$ and $R^7$ include straight, branched or cyclic alkyl groups and aryl groups such as phenyl. Suitable substituted monovalent hydrocarbon groups include fluoroalkyl groups such as trifluoromethyl.

Examples of the compounds of formula (5) include the following compounds having the following formulae (6) to (9):

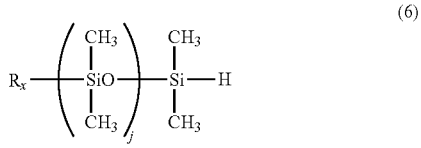
(6)

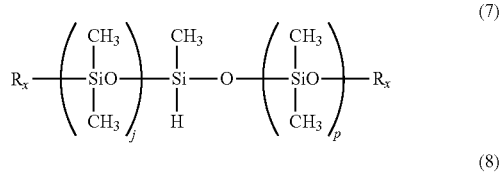
(7)

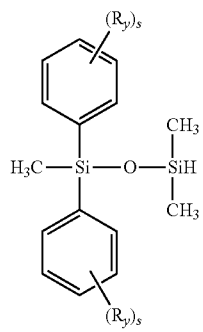
(8)

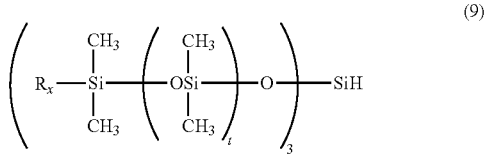
(9)

wherein $R_x$ is $R^3$, $R^4$ or $R^5$ defined above, j, k, p and t each are m+n, $R_y$ is a monovalent hydrocarbon group having 1 to 4 carbon atoms, and s is an integer of 0 to 5.

When the above compounds of formulae (6) to (9) are used, $R^1$ in formula (1) is the group in which H is eliminated from SiH group of formulae (6) to (9).

In the hydrosilylation reaction, the organopolysiloxane represented by formula (5) or formulae (6) to (9) and having only one hydrosilyl group in its molecule is preferably used in such amounts that F/E may fall in the range: 0.05≤F/E≤1.5, more preferably 0.1≤F/E≤1.0 wherein E is the equivalent amount of alkenyl group on the novolak resin and F is the equivalent amount of hydrosilyl group. If F/E<0.05, sufficient flexibility may not be obtained. If F/E>1.5, an excess of siloxane may be left unreacted, leading to a lowering of storage stability.

The addition (or hydrosilylation) reaction between the allyl-containing novolak resin and the organohydrogenpolysiloxane of formula (5) may be conducted in an organic solvent. The organic solvent used herein is not particularly limited as long as both the components dissolve therein to form a uniform solution. Suitable organic solvents include aromatic hydrocarbons such as benzene, toluene and xylene, ethers such as diethyl ether, dibutyl ether, tetrahydrofuran, cyclopentyl methyl ether, and dioxane, ketones such as methyl isobutyl ketone, methyl propyl ketone and methyl pentyl ketone, and alcohols such as ethanol and isopropyl alcohol, which may be used alone or in admixture. The solvent is used in an amount of 1 to 500 parts, preferably 2 to 200 parts by weight per 100 parts by weight of the starting novolak resin.

To the uniform solution of both the components, any of well-known addition catalysts may be added, for example, organic peroxides, tertiary amines, phosphines, and compounds of transition metals such as platinum, palladium and rhodium. Of these, platinum based catalysts such as chloroplatinic acid are preferred. The catalyst may be added in a catalytic amount, typically in the case of platinum based catalysts, in an amount of 1 to 10,000 ppm based on the organosiloxane. In some cases, the catalyst may be replaced by UV irradiation.

Once the catalyst is added, the system is kept at a reaction temperature of 40 to 140° C., preferably 60 to 120° C. for 0.5 to 20 hours, preferably 1 to 10 hours, whereby the allyl group on side chain of the novolak resin is partially modified with the organopolysiloxane, yielding a novolak resin having structural units of the following formula (1).

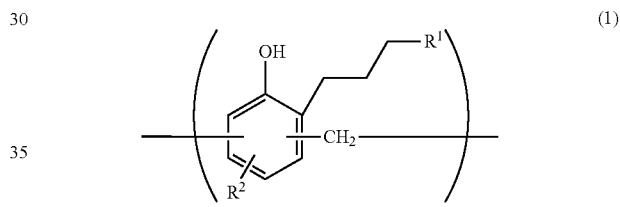
(1)

Herein $R^1$ is an organosiloxy group having a substituted or unsubstituted monovalent hydrocarbon group of 1 to 10 carbon atoms bonded to a silicon atom, preferably an organosiloxy group of the following formula (2), and $R^2$ is hydrogen or a substituted or unsubstituted alkyl or alkoxy group of 1 to 4 carbon atoms.

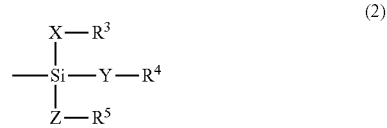
(2)

Herein $R^3$, $R^4$ and $R^5$ are each independently a substituted or unsubstituted monovalent hydrocarbon group of 1 to 10 carbon atoms, x, Y and Z are each independently a single bond or a divalent siloxane structure having the formula (3), with the proviso that at least one of X, Y and Z is a divalent siloxane structure having the formula (3).

The resulting reaction product is ready for use. If necessary, the catalyst is removed by using activated carbon or the like. Also if necessary, the solvent is removed by heating in vacuum or replaced by another solvent, prior to use.

EXAMPLE

Examples are given below by way of illustration and not by way of limitation.

Example 1

A 1-L four neck flask equipped with a condenser and stirrer was charged with 50 g of a novolak resin composed of m-cresol/p-cresol/2-allylphenol in a weight ratio of 36/54/10 and having a Mw of 4,500 and 150 g of cyclopentyl methyl ether. Further 34 g of a SiH-containing polysiloxane having the following formula (10) was added to the flask, which was heated at 60° C., and 0.08 g of a 0.5 wt % isopropyl alcohol solution of chloroplatinic acid was added.

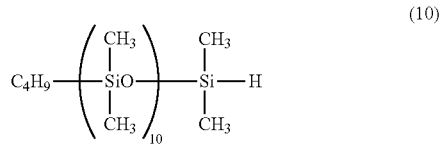
(10)

The flask was then heated at 90° C. for 4 hours for reaction. The solvent was stripped off, recovering the solid matter. The resin thus obtained had a Mw of 7,200 as measured by GPC. The resin was analyzed by $^1$H-NMR spectroscopy, confirming that the desired organopolysiloxane-modified novolak resin had been synthesized. FIG. 1 is the $^1$H-NMR chart of the resin.

Example 2

A 1-L four neck flask equipped with a condenser and stirrer was charged with 50 g of the novolak resin (Example 1) and 1,500 g of cyclopentyl methyl ether. Further 195 g of a SiH-containing polysiloxane having the following formula (11) was added to the flask, which was heated at 60° C., and 0.40 g of a 0.5 wt % isopropyl alcohol solution of chloroplatinic acid was added.

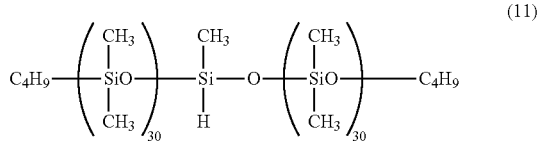
(11)

The flask was then heated at 90° C. for 4 hours for reaction. The solvent was stripped off, recovering the solid matter. The resin thus obtained had a Mw of 9,300. The resin was analyzed by $^1$H-NMR spectroscopy as in Example 1, confirming that the desired organopolysiloxane-modified novolak resin had been synthesized.

Example 3

A 1-L four neck flask equipped with a condenser and stirrer was charged with 50 g of the novolak resin (Example 1) and 150 g of cyclopentyl methyl ether. Further 25 g of a SiH-containing polysiloxane having the following formula (12) was added to the flask, which was heated at 60° C., and 0.08 g of a 0.5 wt % isopropyl alcohol solution of chloroplatinic acid was added.

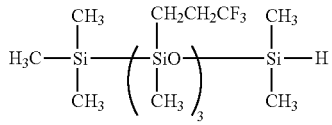
(12)

The flask was then heated at 90° C. for 4 hours for reaction. The solvent was stripped off, recovering the solid matter. The resin thus obtained had a Mw of 6,700. The resin was analyzed by $^1$H-NMR spectroscopy, confirming that the desired organopolysiloxane-modified novolak resin had been synthesized.

Example 4

A 1-L four neck flask equipped with a condenser and stirrer was charged with 50 g of the novolak resin (Example 1) and 150 g of cyclopentyl methyl ether. Further 9.0 g of a SiH-containing polysiloxane having the following formula (13) was added to the flask, which was heated at 60° C., and 0.08 g of a 0.5 wt % isopropyl alcohol solution of chloroplatinic acid was added.

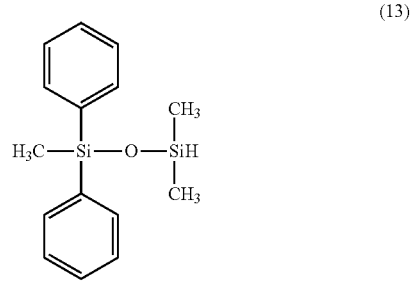
(13)

The flask was then heated at 90° C. for 4 hours for reaction. The solvent was stripped off, recovering the solid matter. The resin thus obtained had a Mw of 5,300. The resin was analyzed by $^1$H-NMR spectroscopy, confirming that the desired organopolysiloxane-modified novolak resin had been synthesized.

Example 5

A 1-L four neck flask equipped with a condenser and stirrer was charged with 50 g of the novolak resin (Example 1) and 150 g of cyclopentyl methyl ether. Further 54 g of a SiH-containing polysiloxane having the following formula (14) was added to the flask, which was heated at 60° C., and 0.08 g of a 0.5 wt % isopropyl alcohol solution of chloroplatinic acid was added.

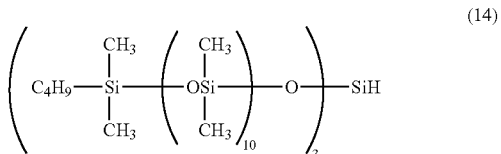
(14)

The flask was then heated at 90° C. for 4 hours for reaction. The solvent was stripped off, recovering the solid matter. The resin thus obtained had a Mw of 9,400. The resin was analyzed by $^1$H-NMR spectroscopy, confirming that the desired organopolysiloxane-modified novolak resin had been synthesized.

Japanese Patent Application No. 2013-170436 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An organosiloxane-modified novolak resin consisting of structural units having the formula (1):

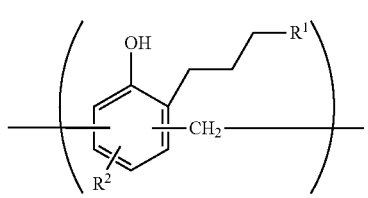
(1)

wherein $R^1$ is an organosiloxy group having the formula (2):

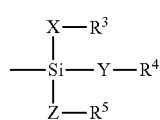
(2)

wherein $R^3$, $R^4$ and $R^5$ are each independently a straight, branched or cyclic alkyl group, aryl group or fluoroalkyl group of 1 to 10 carbon atoms, X, Y and Z are each independently a single bond or a divalent siloxane structure having the formula (3), with the proviso that at least one of X, Y and Z is a divalent siloxane structure having the formula (3),

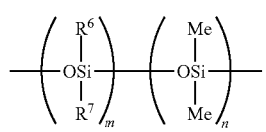
(3)

wherein $R^6$ and $R^7$ are each independently a straight, branched or cyclic alkyl group, aryl group or fluoroalkyl group of 1 to 10 carbon atoms, Me is methyl, m and n each are 0 or a positive number, and m+n is an integer of at least 1, and $R^2$ is hydrogen or an unsubstituted alkyl or fluoroalkyl or alkoxy group of 1 to 4 carbon atoms.

2. A method for preparing an organosiloxane-modified novolak resin, comprising effecting hydrosilylation reaction between an allyl-containing novolak resin consisting of structural units having the formula (4):

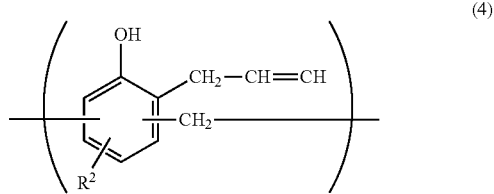
(4)

wherein $R^2$ is hydrogen or an alkyl or fluoroalkyl or alkoxy group of 1 to 4 carbon atoms and an organosiloxane containing one hydrosilyl group in a molecule.

3. The method of claim 2 wherein the organosiloxane containing one hydrosilyl group in a molecule has the formula (5):

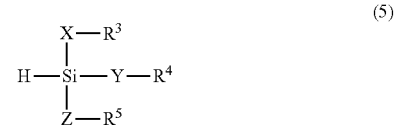
(5)

wherein $R^3$, $R^4$ and $R^5$ are each independently a straight, branched or cyclic alkyl group, aryl group or fluoroalkyl group of 1 to 10 carbon atoms, X, Y and Z are each independently a single bond or a divalent siloxane structure having the formula (3), with the proviso that at least one of X, Y and Z is a divalent siloxane structure having the formula (3),

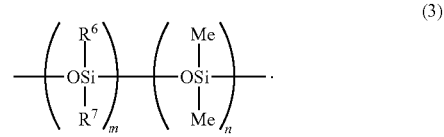
(3)

wherein $R^6$ and $R^7$ are each independently a straight, branched or cyclic alkyl group, aryl group or fluoroalkyl group of 1 to 10 carbon atoms, Me is methyl, m and n each are 0 or a positive number, m+n is an integer of at least 1.

4. The organosiloxane-modified novolak resin of claim 1, wherein $R^1$ is a residue of an organosiloxy group having the formula (6):

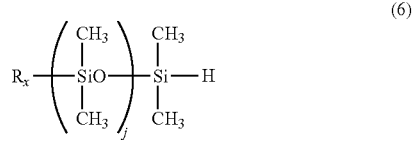
(6)

wherein $R_x$ is a straight, branched or cyclic alkyl group, aryl group or fluoroalkyl group of 1 to 10 carbon atoms, and j is m+n.

5. The organosiloxane-modified novolak resin of claim 1, wherein $R^1$ is a residue of an organosiloxy group having the formula (7):

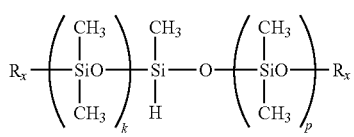 (7)

wherein $R_x$ is a straight, branched or cyclic alkyl group, aryl group or fluoroalkyl group of 1 to 10 carbon atoms, and k and p are each m+n.

6. The organosiloxane-modified novolak resin of claim 1, wherein $R^1$ is a residue of an organosiloxy group having the formula (8):

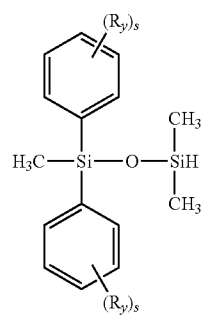 (8)

wherein $R_y$ is a monovalent hydrocarbon group having 1 to 4 carbon atoms, and s is an integer of 0 to 5.

7. The organosiloxane-modified novolak resin of claim 1, wherein $R^1$ is a residue of an organosiloxy group having the formula (9):

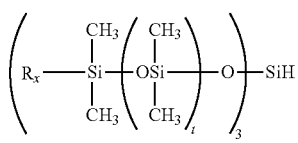 (9)

wherein $R_x$ is a straight, branched or cyclic alkyl group, aryl group or fluoroalkyl group of 1 to 10 carbon atoms, and t is m+n.

8. The method of claim 2, wherein the organosiloxane containing one hydrosilyl group in a molecule has the formula (6):

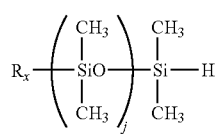 (6)

wherein $R_x$ is a straight, branched or cyclic alkyl group, aryl group or fluoroalkyl group of 1 to 10 carbon atoms, and j is m+n.

9. The method of claim 2, wherein the organosiloxane containing one hydrosilyl group in a molecule has the formula (7):

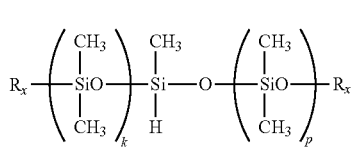 (7)

wherein $R_x$ is a straight, branched or cyclic alkyl group, aryl group or fluoroalkyl group of 1 to 10 carbon atoms, and k and p are each m+n.

10. The method of claim 2, wherein the organosiloxane containing one hydrosilyl group in a molecule has formula (8):

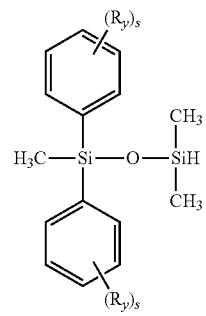 (8)

wherein $R_y$ is a monovalent hydrocarbon group having 1 to 4 carbon atoms, and s is an integer of 0 to 5.

11. The method of claim 2, wherein the organosiloxane containing one hydrosilyl group in a molecule has the formula (9):

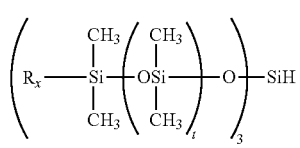 (9)

wherein $R_x$ is a straight, branched or cyclic alkyl group, aryl group or fluoroalkyl group of 1 to 10 carbon atoms, and t is m+n.

12. The method of claim 2, wherein in the hydrosilylation reaction the organosiloxane is used in such amounts that F/E is in the range of $0.05 \leq F/E \leq 1.5$, wherein E is the equivalent amount of alkenyl group on the novolak resin and F is the equivalent amount of hydrosilyl group.

13. The method of claim 12, wherein F/E is in the range of $0.1 \leq F/E \leq 1.0$.

* * * * *